United States Patent [19]

Hamasaki et al.

[11] Patent Number: 4,838,576

[45] Date of Patent: Jun. 13, 1989

[54] IMPACT ENERGY ABSORBING MECHANISM FOR A STEERING DEVICE OF A MOTOR VEHICLE

[75] Inventors: Yoshito Hamasaki; Akira Iwasaki; Hiroaki Sue, all of Wako, Japan

[73] Assignee: Honda Giken Kogyo Kabushiki Kaisha, Tokyo, Japan

[21] Appl. No.: 227,928

[22] Filed: Aug. 3, 1988

[30] Foreign Application Priority Data

Aug. 4, 1987 [JP] Japan .............................. 62-118825[U]

[51] Int. Cl.⁴ ............................................... B62D 1/18
[52] U.S. Cl. ..................... 280/777; 280/779; 74/492; 188/372
[58] Field of Search .................. 280/777, 779, 780; 188/372; 74/492

[56] References Cited

U.S. PATENT DOCUMENTS

| | | | |
|---|---|---|---|
| 3,600,971 | 8/1971 | Scarvelis et al. ................... | 74/492 |
| 3,665,778 | 5/1972 | Bohan et al. ......................... | 74/492 |
| 4,102,217 | 7/1978 | Yamamato et al. ................. | 280/777 |
| 4,630,716 | 12/1986 | Faust ................................. | 74/492 X |

FOREIGN PATENT DOCUMENTS

| | | | |
|---|---|---|---|
| 2821707 | 11/1978 | Fed. Rep. of Germany ...... | 280/777 |
| 46-35526 | 10/1971 | Japan ................................... | 280/777 |
| 0011377 | 1/1977 | Japan ................................... | 188/372 |
| 60-7262 | 1/1985 | Japan ................................... | 280/777 |
| 2059006 | 4/1981 | United Kingdom ............... | 188/372 |

Primary Examiner—Charles A. Marmor
Assistant Examiner—Brian L. Johnson
Attorney, Agent, or Firm—Armstrong, Nikaido, Marmelstein, Kubovcik & Murray

[57] ABSTRACT

An impact energy absorbing mechanism for a steering device of a motor vehicle includes guides each having a generally U-shaped guide surface. Each guide is mounted to a steering column which is movable in the axial direction when the operator's body is thrown out onto a steering wheel due a collision of the vehicle. A retaining portion is provided integrally with the guide and at a predetermined distance from the guide surface. An absorbing plate is fixed at one end to the vehicle body and left free at the other end. The free end of the absorbing plate is inserted and retained in a gap defined between the guide surface and retaining portion of the guide, so that the absorbing plate is held in a generally U-shaped bent position along the guide surface. When the guide is moved together with the steering column, the bent portion of the absorbing plate is sequentially shifted while maintaining the shape which is defined by the guide, thereby absorbing impact energy.

5 Claims, 3 Drawing Sheets

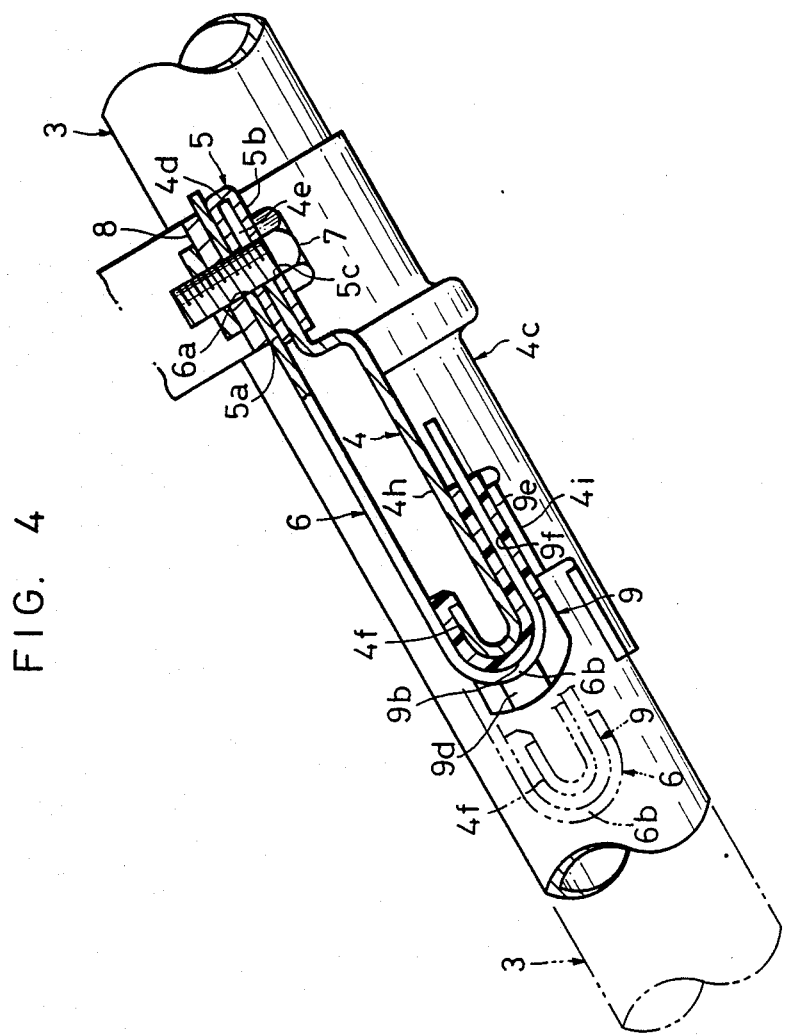

IMPACT ENERGY ABSORBING MECHANISM FOR A STEERING DEVICE OF A MOTOR VEHICLE

BACKGROUND OF THE INVENTION

The present invention relates to an impact energy absorbing mechanism applicable to a steering device of a motor vehicle for absorbing impact energy ascribable to the operator's body which is thrown out onto a steering wheel of the steering device in the event of collision of the vehicle. More particularly, the present invention relates to an impact energy absorbing mechanism of the type including an absorbing plate which is bent generally in the form of letter U and, in the event of a collision, caused to deform with its bent portion sequentially shifted so as to absorb impact energy.

The steering device of a modern motor vehicle is usually provided with an impact energy absorbing mechanism to reduce an impact which is applied to a steering wheel when the operator's body hits against the steering wheel due to inertia in the event of collision of the vehicle. A prerequisite with such a mechanism is that the amount of energy absorption for a predetermined stroke of the steering wheel be constant to insure a desired energy absorbing effect.

An impact energy absorbing mechanism for the above-described application has previously been proposed in various forms. One of prior art mechanisms includes an absorbing plate which is bent in the form of a letter U at the time of assembly. Specifically, the generally U-shaped absorbing plate is deformable with its bent portion sequentially shifted to absorb impact energy. This kind of mechanism needs a minimum of exclusive space and, despite a simple structure, achieves a large stroke and therefore a large amount of energy absorption.

Typical of prior art mechanisms of the type using an absorbing plate is disclosed in Japanese Patent Publication No. 46-35526. In this Patent Publication, a steering shaft is divided into an upper shaft and a lower shaft which are telescopically coupled together. One of the upper and lower shafts is provided with a lengthwise channel, and an absorbing plate is received in the channel in such a manner as to form a bend. The opposite ends of the absorbing plate are each fixed to a respective one of the two shafts. When the upper shaft is displaced relative to the lower shaft, the absorbing plate is deformed with its bend sequentially shifted to absorb impact energy.

A problem with the above-described type of prior art mechanism is that it is difficult to surely maintain the radius of curvature of the bend of the absorbing plate constant while the deformation of the plate is under way, because the plate is simply received in a space between the upper and lower shafts. Hence, a constant energy absorbing effect is hard to achieve with such a prior art mechanism. The lengthwise channel formed through the steering shaft is undesirable because it reduces the rigidity of the shaft and thereby prevents sufficient rigidity necessary for the transmission of a steering effort through the shaft from being attained. The decrease in rigidity has to be compensated for by increasing the diameter of the shaft. In addition, an extra machining step is needed to form the lengthwise channel through the shaft. Furthermore, the available stroke of the upper shaft and therefore the energy absorbing ability of the mechanism is limited because the absorbing plate is connected to the upper and lower shafts at opposite ends thereof.

In light of the above, Japanese utility Model Publication No. 690-7262 discloses a mechanism wherein flanges are securely connected to opposite sides of a steering column which rotatably supports a steering shaft. An absorbing plate produced by bending a sheet metal in the form of letter U is provided with recesses which are open toward the steering wheel. The flanges and the absorbing plate are fastened to a vehicle body by bolts with the flanges being interposed between the opposite legs of the absorbing plate. When the operator's body is thrown out onto the steering wheel due to collision, the steering column is moved forward to causes the flanges to sequentially shift the bend portion of the absorbing plate with their edges, thereby absorbing the impact energy.

With the flanges an absorbing plate scheme described above, the absorbing plate is deformed by the edges of the flanges while maintaining the radius of curvature of its bent portion constant and, hence, the amount of energy absorption due to bending deformation remains constant. The impact energy is also absorbed by the friction acting between the absorbing plate and the flanges and vehicle body and the tension or stretching force applied to the absorbing plate. Therefore, the total energy absorbing effect attainable with such a prior art mechanism is considerable. Further, it is not necessary to increase the diameter of the steering shaft because a channel for accommodating the absorbing plate is not needed.

However, the mechanism relying on flanges and an absorbing plate as stated above has a problem left unsolved. Specifically, since the absorbing plate is fastened to a vehicle body by bolts together with the flanges of the steering column, the frictional force acting between the flanges and the vehicle body and contributing to the absorption of impact energy is effected by the fastening force of the bolts. Then, the energy absorption characteristic itself is changed by the fastening force of the bolts, preventing a predetermined energy absorbing effect from being achieved. since it is extremely difficult to maintain the fastening force of the bolts constant and since the coefficient of friction of a member which forms a part of a vehicle body depends upon the kind of motor vehicle, mounting the impact energy absorbing mechanism while insuring a desired energy absorbing characteristic is extremely difficult.

SUMMARY OF THE INVENTION

It is therefore an object of the present invention to provide an impact energy absorbing mechanism for a steering device of a motor vehicle which allows a desired energy absorption characteristic to be set up with ease and exhibits a sufficient energy absorbing effect.

It is another object of the present invention to provide an impact energy absorbing mechanism in which an absorbing plate maintains the radius of curvature of its bent portion constant while a frictional force is prevented from acting between the absorbing plate and an external member such as a vehicle body.

It is another object of the present invention to provide an impact energy absorbing mechanism which can be readily mounted without having its energy absorption characteristic effected at all.

An impact energy absorbing mechanism for a steering device of a motor vehicle of the present invention comprises a steering column supported by a body of the motor vehicle in such a manner that, when a force of a magnitude greater than a predetermined magnitude is applied in an axial direction to the steering column, the steering column is movable in the same direction as the force, a guide movable in the same direction as the steering column when the steering column is moved in the axial direction and an absorbing plate extending in the axial direction of the steering column and having one end being fixed o the body of the motor vehicle and the other end being left free. The guide comprises a guide body having a generally U-shaped guide surface with which the absorbing plate makes contact, and an absorbing plate retaining portion formed integrally with the guide body and at a predetermined distance from the guide surface. A part of the absorbing plate adjacent to the other end is inserted in and retained in a gap formed between the guide body and the absorbing plate retaining portion, whereby the absorbing plate is retained in a generally U-shaped bent position.

BRIEF DESCRIPTION OF THE DRAWINGS

The above and other objects, features and advantages of the present invention will become more apparent from the following detailed description taken with the accompanying drawings in which:

FIG. 4 is a sectional side elevation showing the mechanism of FIG. 1 in a mounted condition.

DESCRIPTION OF THE PREFERRED EMBODIMENT

Figure 1:
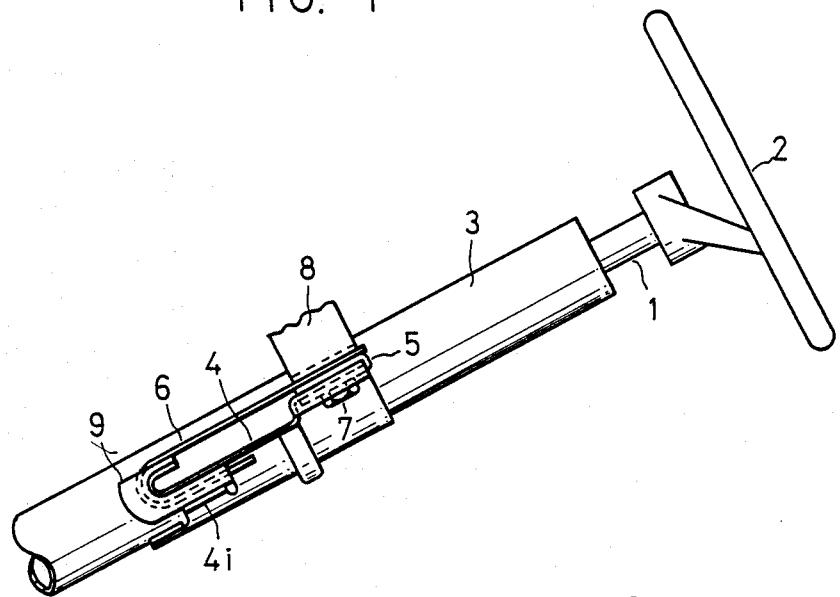
FIG. 1 is a schematic side elevation showing an impact energy absorbing mechanism embodying the present invention together with an essential part of a steering device of a motor vehicle.

Referring to FIG. 1 of the drawings, an impact energy absorbing mechanism embodying the present invention is shown. As shown, a steering wheel 2 is securely mounted on one end of a steering shaft 1 while a steering gear (not shown) is connected to the other end of the steering shaft 1 via a joint. The steering shaft 1 is rotatably supported by a steering column 3 through suitable means such as bearings. A force applied to the steering wheel 2 in the axial direction is transmitted to the steering column 3 by way of the steering shaft 1.

A column bracket 4 is rigidly mounted on the steering column 3. The column bracket 4 is fixed to a bracket 8 of a vehicle body by bolts 7 through generally U-shaped sliding plates 5 and one end of absorbing plates 6. The sliding plates 5 are individually engaged with a rear end portion of the column bracket 4. The absorbing plates 6 each includes a generally U-shaped portion. When an impact force of a magnitude which is greater than a predetermined magnitude is applied to the steering wheel 2 such as when the operator's body hits against the steering wheel 2 due to inertia in the event of collision of the motor vehicle, the column bracket 4 is released from the vehicle body bracket 8 to allow the steering column 3 to move along the axis thereof. The other or free end of each absorbing plate 6 is guided by a guide 9 which is removably engaged with a front end portion of the column bracket 4.

Figure 2:
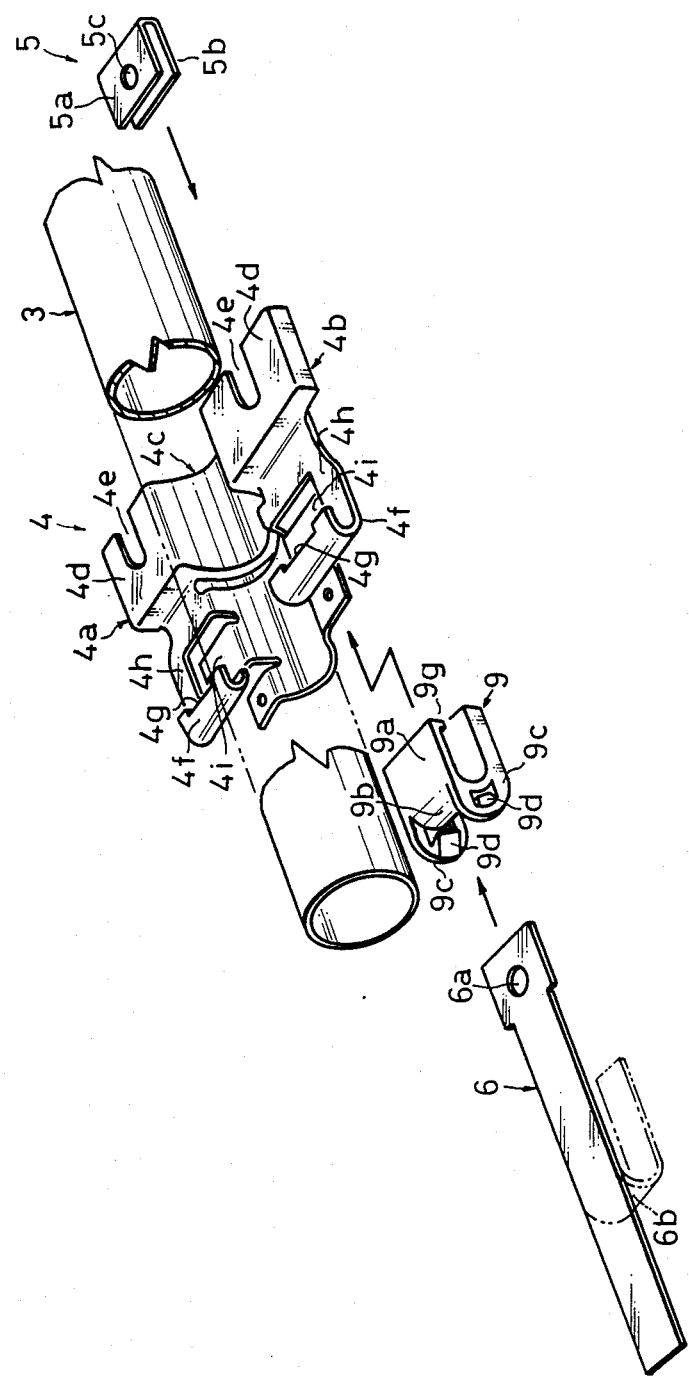
FIG. 2 is an exploded perspective view of the mechanism of FIG. 1.

As shown in detail in FIG. 2, the column bracket 4 comprises a right mounting member 4a, a left mounting member 4b, and a generally U-shaped connecting member or intermediate webbing 4c interconnecting the right and left members 4a and 4b in a symmetrical configuration. A mounting portion 4d is provided at the rear end of each of the mounting members 4a and 4b and formed with a generally U-shaped recess 4e which is open toward the steering wheel 2. A retaining portion 4f is provided at the front end of each of the mounting members 4a and 4b for retaining the guide 9 and formed with a recess 4g. The mounting portion 4d and retaining portion 4f are interconnected by a connecting portion 4h. The intermediate webbing 4c between the right and left members 4a and 4b includes a right and a left support portion 4i below the retaining portions 4f for individually supporting the guides 9. The steering column 3 is supported by the generally U-shaped connecting member 4c and welded to the mounting portions 4d, retaining portions 4f and connecting portions 4h with which it makes contact. It is to be noted that the mounting members 4a and 4b and the sliding plates 5, absorbing plates 6 and guides 9 (only one being shown for each) associated with the mounting plates 4a and 4b are individually identical in configuration and, therefore, the following description will concentrate on those members which are depicted in FIG. 2 by way of example.

The generally U-shaped sliding plate 5 includes a top wall 5a and a bottom wall 5b each being formed with an opening 5c at substantially the center thereof. At least those surfaces of the sliding plate 5 which make contact with the associated mounting portion 4d of the column bracket 4 are formed from a material having a relatively small coefficient of friction. The sliding plate 5 is coupled over the mounting portion 4d from the steering wheel 2 side and slidable when a force greater than a predetermined magnitude is exerted on the bracket 4.

The absorbing plate 6 is implemented with a strip of sheet metal which extends in the axial direction of the steering column 3, the strip being formed with an opening 6a through its rear end portion. The strip 6 is deformed in the form of letter U at the stage of assembly to include a bend 6b.

Figure 3A:
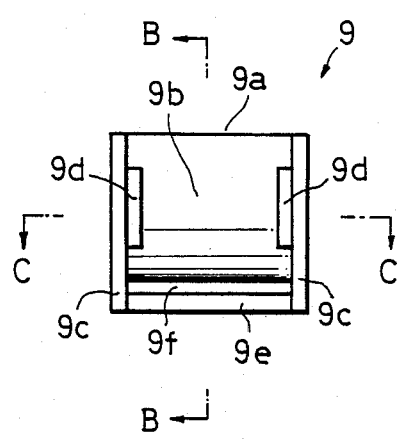
FIG. 3A is a front view showing a guide which is included in the mechanism of FIG. 1.
Figure 3B:
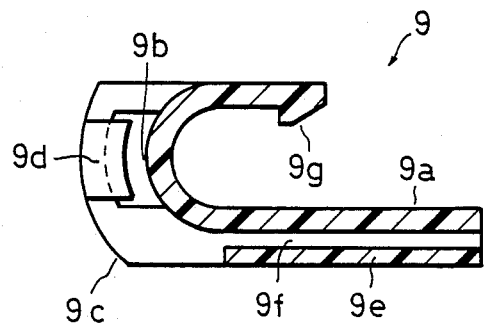
FIG. 3B is a section along line B—B of FIG. 3A.
Figure 3C:
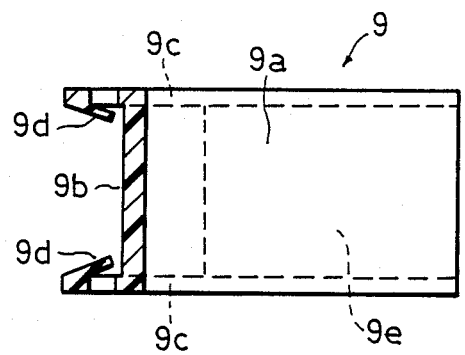
FIG. 3C is a sectional plan view along line C—C of FIG. 3A.

As shown in FIGS. 3A, 3B and 3C, the guide 9 includes a body portion 9a which is bent generally in a U shape in its longitudinal direction. The outer surface of such a U-shaped bend of the body portion 9a defines a guide surface 9b. The guide surface 9b may have any suitable curved configuration such as a semiellipse. A pair of flanges 9c are provided at laterally opposite sides of the guide body 9a to individually extend from the front end to the bottom of the guide body 9a. The distance between flanges 9c is substantially equal to the width of the absorbing plate 6. Front end portions of the flanges 9c are individually cut and raised to form guide pawls 9d which protrude toward the intermediate between the flanges 9c. At the bottom of the guide body 9a, a support plate 9e is retained by the opposite flanges 9c to define a through bore 9f in cooperation with the guide body 9a. The through bore 9f is so dimensioned as to accommodate the free end of the absorbing plate 6. A pawl 9g extends downward from the upper end of the guide body 9a. The guide 9 is implemented as a single molding of plastic.

The impact energy absorbing mechanism having the above construction is mounted on a vehicle body by the following procedure. First, the sliding plate 5 is coupled over the mounting portion 4d of the column bracket 4 while being positioned such that its opening 5c is aligned with the recess 4e of the mounting portion 4d. The guide 9 is engaged with the retaining portion 4f of the column bracket 4 from the front to mate its pawl 9g with the recess 4g, and the bottom of the guide 9 is supported on the support portion 4i of the column bracket 4. then, the end of the strip 6 remote from the bolt hole 6a is inserted into the gap between the tips of the guide pawls 9d and the guide body 9a and further into the through bore 9f. This is followed by bending the strip 6 along the guide surface 9b of the guide 9 to form the bend 6b and laying that end of the strip 6 where the opening 6a is located on the sliding plate 5 such that the opening 6a aligns with the opening 5c. Then, the bolt 7 is passed though the opening of the sliding plate 5, recess 4e of the column bracket 4 and the opening 6a of the absorbing plate 6 which are in alignment and is then fastened to the vehicle body bracket 8. In this manner, the whole impact energy absorbing mechanism is mounted to the vehicle body together with the steering device.

In operation, when the operator's body is thrown out onto the steering wheel 2 due to a collision of the vehicle, an impact force great enough to overcome the frictional force acting between the mounting portion 4d of the column bracket 4 and the sliding plate 5 is applied to the steering column 3. As a result, the steering column 3 is moved in the axial direction together with the column bracket 4. At this instant, the frictional force serves to absorb a part of the impact energy. The fixed end of the sliding plate 5 and that of the absorbing plate 6 are prevented from moving by the bolt 7 and therefore maintained in fixed positions.

As the steering column 3 is moved, the guide 9 is moved in the same direction as the steering column 3 to in in turn urge the bend 6b of the absorbing plate 6 with its own bend. Consequently, the absorbing plate 6 is deformed such that its bend 6b sequentially shifts toward the free end of the plate 6, as represented by a dash-and-dots line in FIG. 4. At the same time, a tension acts on the absorbing plate 6 to stretch it. Further, a frictional force is developed between the absorbing plate 6 and the guide surface 9b and support plate 9e of the guide 9. Due to such bending deformation, stretching deformation and friction, the absorbing plate 6 absorbs the impact energy. In this manner, the absorbing plate 6 and guide 9 constitute the impact energy absorbing mechanism in cooperation.

While the guide 9 is in movement, the absorbing plate 6 is surely guided along the guide surface 9b of the guide 9 by the guide pawls 9d and the support plate 9e which defines the through bore 9f. Hence, the absorbing plate 6 is sequentially deformed with the radius of curvature of its bend 6b remaining constant. The frictional force acting between the absorbing plate 6 and the guide surface 9b remains constant partly because they are held in uniform contact with each other and partly because they are physically isolated from the fastening force of the bolt 7. In addition, the flanges 9c provided at the opposite sides of the guide body 9a restrict the lateral movement or oscillation of the absorbing plate 6 while the deformation of the plate 6 is under way, thereby holding the plate 6 in a stable manner.

In summary, the impact energy absorbing mechanism described above is capable of absorbing a predetermined amount of energy without fail and exhibits a stable energy absorption characteristic. This kind of mechanism can therefore be provided with any desired energy absorption characteristic with ease and, since it is not necessary to take the fastening force of the bolt 7 into account, can be mounted with ease. Since one end of the absorbing plate 6 is free, the stroke of the steering column 3 can be increased within the dimension of the absorbing plate 6 to achieve an extremely great energy absorbing ability.

Further, the absorbing plate 6 is held in contact with the molded plastic guide 9 and therefore prevented from producing noise despite the contact when the vehicle body vibrates. Since the absorbing plate 6 is implemented as a simple flat strip, it needs a minimum of space for installation and, thanks to the simple structure, can be produced with a minimum of cost.

Various modifications will become possible for those skilled in the art after receiving the teachings of the present disclosure without departing from the scope thereof. For example, the guide retaining portion 4f which is shown and described as being unitary with the column bracket 4 may be implemented by a member which is separate from the column bracket 4. If desired, the bend 6b of the absorbing plate 6 may be slightly spaced apart from the guide surface 9b of the guide 9 instead of being held in contact with it as in the illustrative embodiment. The gist is that the position of the guide 9 with which the plate 6 makes contact be prevented from being changed during the movement of the guide 9. Hence, when the bend 6b is spaced apart from the guide surface 9b, the guide pawls 9d are omissiple. The support plate 9e may be also provided at the fixed end side of the absorbing plate 6. Furthermore, the absorbing plate 6 may alternatively be positioned between the head of the bolt 7 and the sliding plate 5.

What is claimed is:

1. An impact energy absorbing mechanism for a steering device of a motor vehicle, comprising:

a steering column supported by a body of the motor vehicle in such a manner that, when a force of a magnitude greater than a predetermined magnitude is applied in an axial direction to said steering column, said steering column is movable in the same direction as said force;

a guide is securely coupled to and is movable in the same direction as said steering column when said steering column is moved in the axial direction; and a deformable absorbing plate extending in the axial direction of said steering column and having one end being fixed to the body of the motor vehicle and the other end being left free;

said guide comprising a guide body having a generally U-shaped guide surface with which said absorbing plate makes contact, the longitudinal axis of said U-shaped being substantially parallel to the longitudinal axis of said steering column, and an absorbing plate retaining portion formed integrally with said guide body and at a predetermined distance from said guide surface;

a part of said absorbing plate adjacent to said other end being inserted in and retained in a gap formed between said guide body and said absorbing plate retaining portion, whereby said absorbing plate is retained in a generally U-shaped bent position.

2. A mechanism as claimed in claim 1, wherein said guide further comprises flanges each extending from a respective one of opposite sides of said guide surface for restricting movement of said absorbing plate in a lateral direction.

3. A mechanism as claimed in claim 2, wherein said absorbing plate retaining portion comprises a support plate which extends between said flanges.

4. A mechanism as claimed in claim 2, wherein said absorbing plate retaining portion comprises guide pawls each extending from a respective one of said flanges toward a portion of said guide between said flanges.

5. A mechanism as claimed in claim 1, wherein said guide comprises a molding of plastic and is removably fitted to a column bracket which is securely mounted on said steering column.

* * * * *